J. A. DALEN.
WIND TURBINE.
APPLICATION FILED OCT. 18, 1915.
1,186,289.
Patented June 6, 1916.
4 SHEETS—SHEET 1.
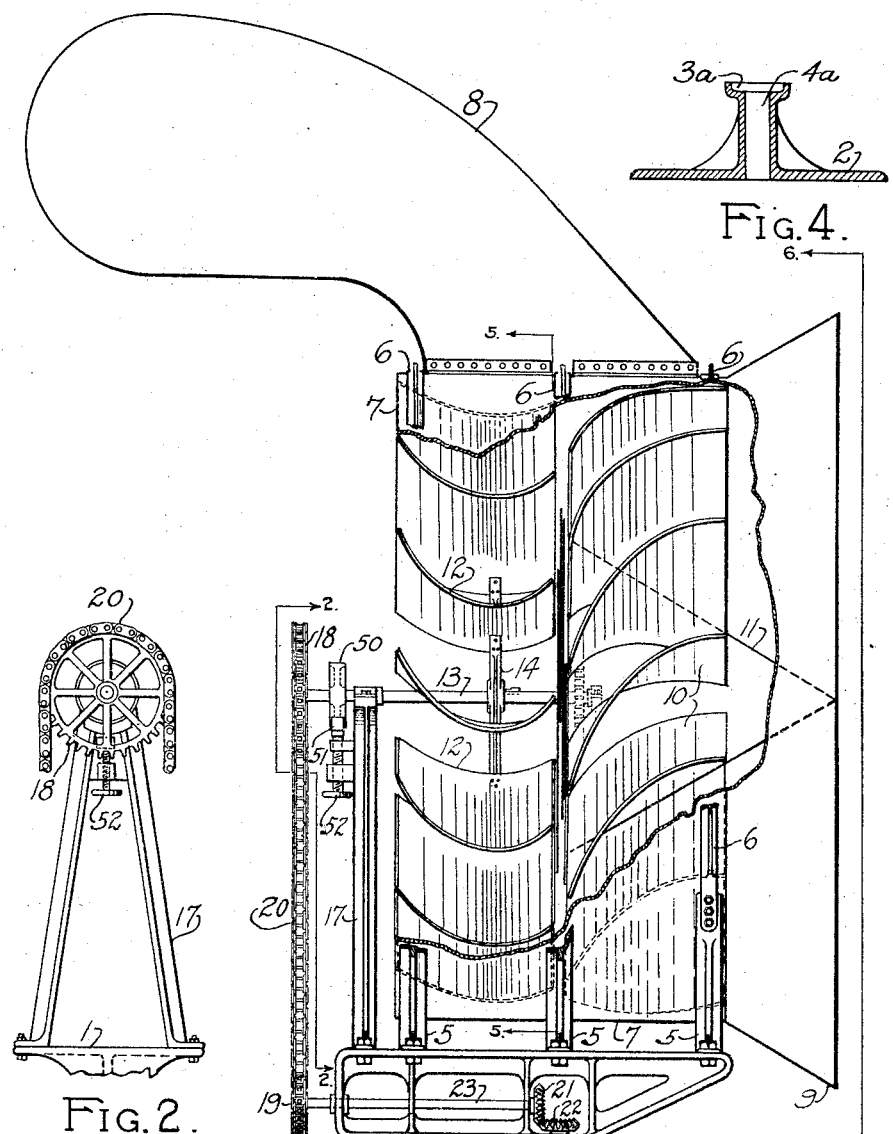
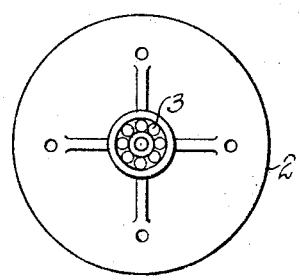
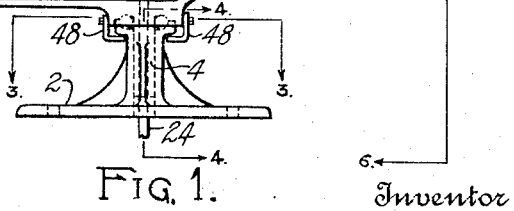
Inventor
JOHN A. DALEN
By his Attorney
Albert Bersin

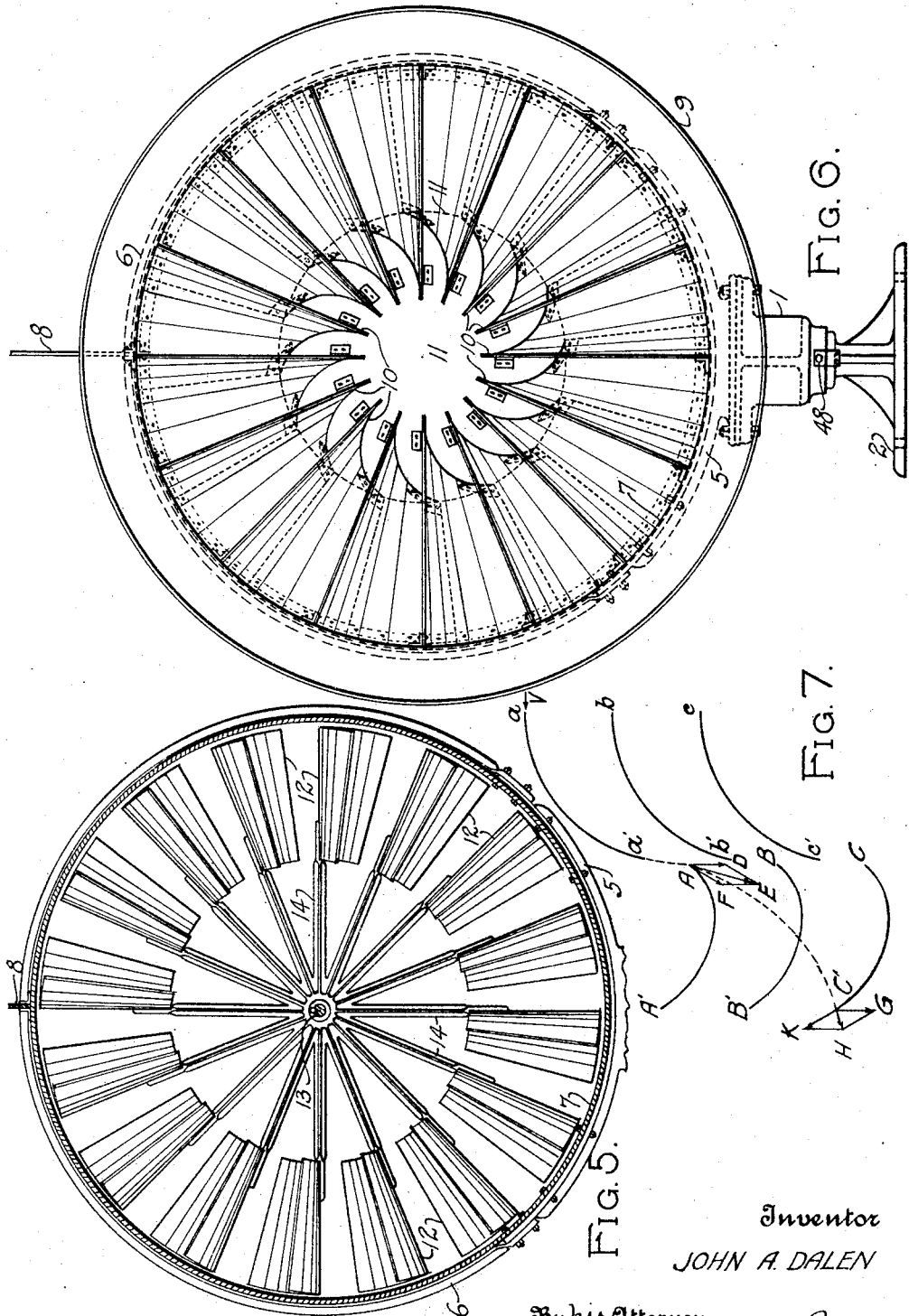

J. A. DALEN.
WIND TURBINE.
APPLICATION FILED OCT. 18, 1915.

1,186,289.

Patented June 6, 1916.
4 SHEETS—SHEET 3.

Inventor
JOHN A. DALEN
By his Attorney
Albert Bersin

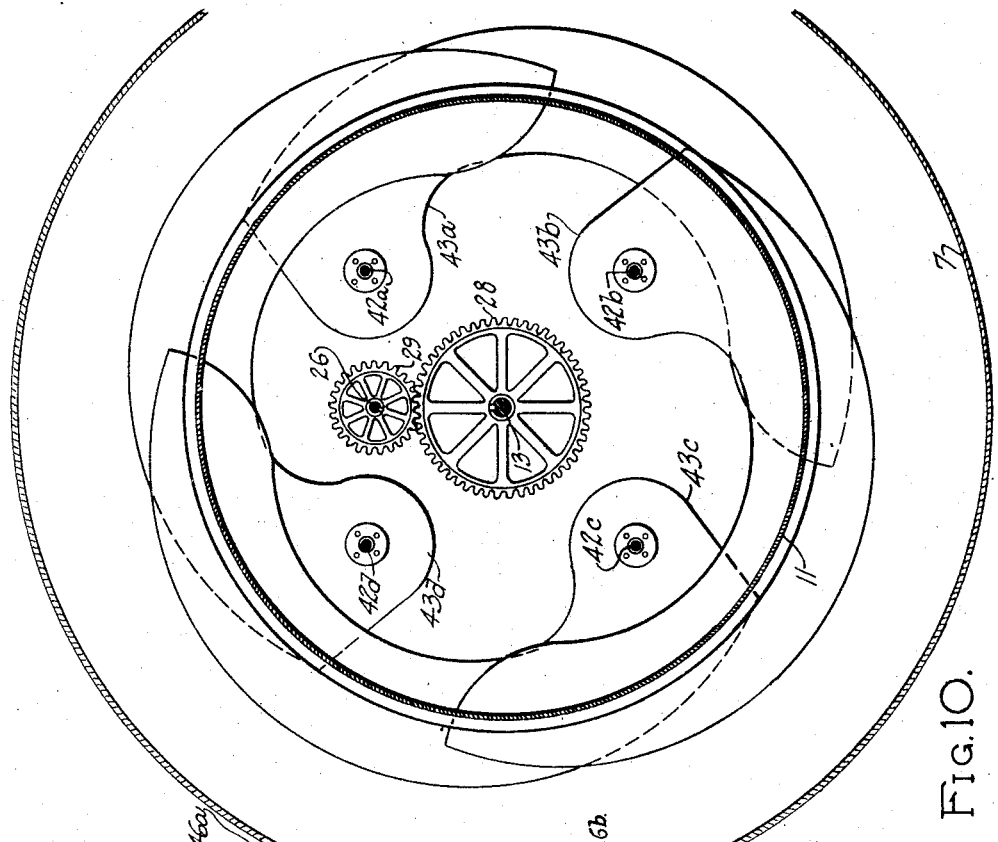

UNITED STATES PATENT OFFICE.

JOHN ALBERT DALEN, OF BROOKLYN, NEW YORK.

WIND-TURBINE.

1,186,289.  Specification of Letters Patent.  Patented June 6, 1916.

Application filed October 18, 1915. Serial No. 56,457.

*To all whom it may concern:*

Be it known that I, JOHN A. DALEN, citizen of the United States, and resident of Brooklyn, in the county of Kings and State of New York, have invented certain new and useful Improvements in Wind-Turbines, of which the following is a specification.

This invention relates to wind motors of the type having a rotating wheel provided with a plurality of curved vanes and stationary curved guides for deflecting the wind toward the vanes.

The general object of the present invention is to provide a pressure turbine in which the wind is made to strike the vanes without impact for the purpose of obtaining a greater power from the wind than is possible with existing machines. I obtain this object by shaping the stationary guides so that the tangents to the curve at entrance are in the direction of the wind, while at the exit they are curved toward the vanes of the rotating wheel, so that the wind strikes them without impact. The vanes of the rotating wheel are curved backward so that the tangents to the curve at entrance and exit of wind form acute angles with the direction of rotation of the wheel.

Another feature of my device is that it is provided with an outer shell incasing the vanes and guides, thereby forming a closed channel and preventing the wind caught on the vanes from leaving the same laterally.

Another feature of my machine is that it is provided with a cone shaped shell with small resistance, placed in front of the vanes with its vertex pointing outwardly, effectively causing the wind to deflect toward the periphery and thereby increasing the leverage of its action on the vanes and thus the power of the machine.

Another feature of my machine is that it is provided with an automatic regulating device whereby the wheels may be kept at a constant speed at any wind velocity at or above a desired minimum.

Another feature of my machine is that it is provided with an adjusting device whereby a desired constant speed can be fixed for several assumed wind velocities.

Other features and advantages of my machine will be apparent from the detailed description and the accompanying drawings forming a part of this specification, in which similar numerals indicate corresponding parts in all the views, in which—

Figure 9:
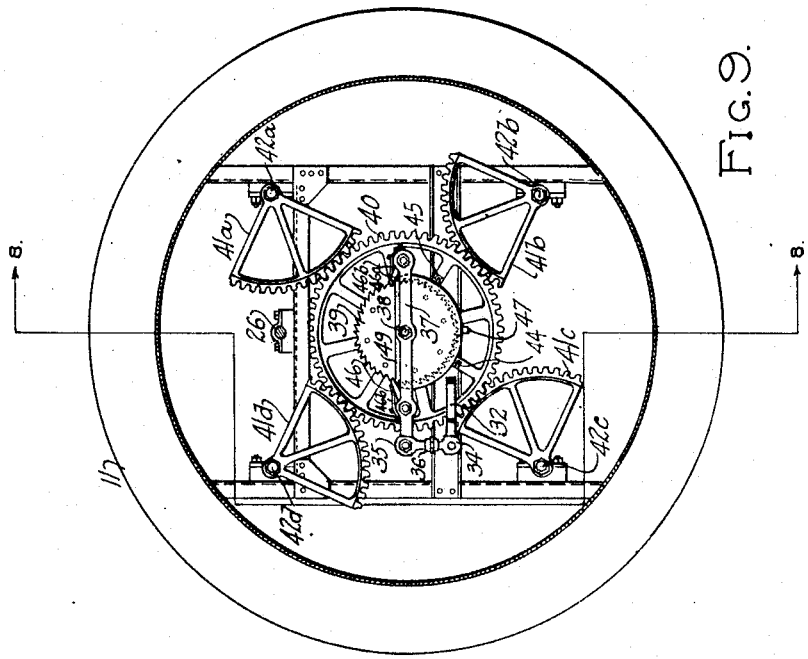
Figure 8:
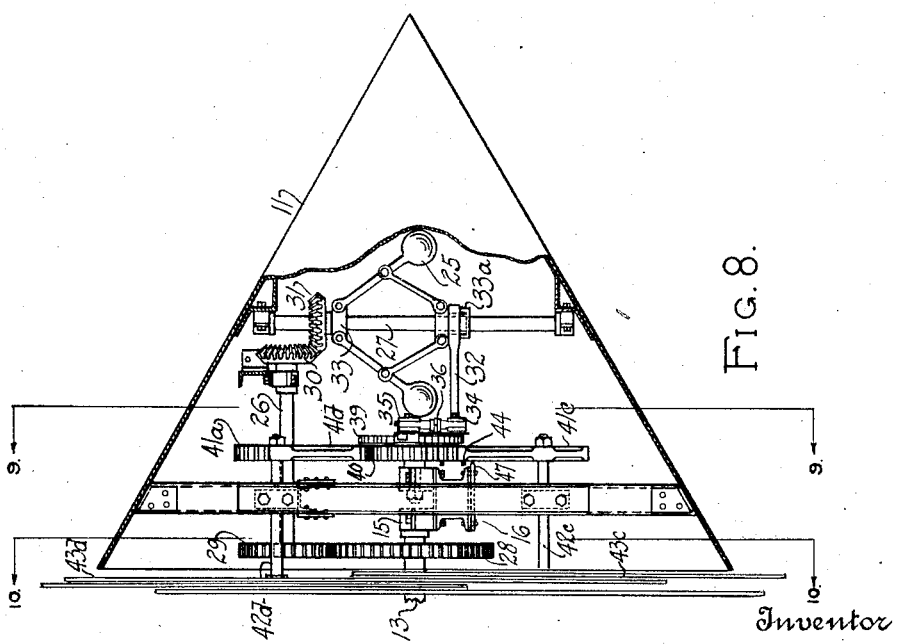

Figure 1 is a side elevation of my machine with a portion of the outer shell broken away to show the stationary guides and the wheel vanes; Fig. 2 is an elevation looking in the direction of line 2—2 of Fig. 1; Fig. 3 is a plan of the pedestal looking in the direction of line 3—3 of Fig. 1 with the upper frame omitted; Fig. 4 is a section of the pedestal taken on line 4—4 of Fig. 1; Fig. 5 is a section on line 5—5 of Fig. 1; Fig. 6 is an elevation looking in the direction of line 6—6 of Fig. 1; Fig. 7 is a diagram of the curve of the vanes and guides; Fig. 8 is a side view of the cone 11 with the outer shell broken away to show the interior mechanism and looking in the direction of line 8—8 of Fig. 9; Fig. 9 is a section on line 9—9 of Fig. 8; Fig. 10 is a section on line 10—10 of Fig. 8; and Figs. 11 and 12 are large scale details of the mechanism controlling the speed of the machine.

Referring to Figs. 1 and 2, the supporting frame 1 having a projecting hollow cylindrical portion 4 is mounted upon the pedestal 2 by having its cylinder 4 fitting into the cylindrical opening 4ª in the pedestal 2, as shown in Fig. 4. The ball bearings 3 are placed in the cavities 3ª of Fig. 4, thus allowing free rotation of frame 1 upon the pedestal 2 which in turn may be fastened to any suitable support. The bent clips 48 are fastened to the frame 1 and are adapted to overlap the projection in the pedestal 2, as is clearly shown in Fig. 1, for the purpose of preventing the lifting off of frame 1 from the pedestal 2 in a strong wind. The casing 7 having a cone shaped or flaring opening 9 is fixed to the supporting frame 1 by means of the blocks 5. (See Figs. 1 and 6.) The bands 6 are provided to hold the casing 7 rigidly to the blocks 5. The wind vane 8 fixed at the top of the casing 7 is provided in order to have the opening 9 always facing the wind.

Referring to Figs. 1, 6, and 8, the cone shaped shell 11 is fixed to the casing 7 while the curved guides 10 are fixed to both the casing 7 and the cone shaped shell 11. The wheel 14 fixed to the shaft 13 is provided with curved peripheral vanes 12. The curve of the vanes 12 and the guides 10 and their relation is shown in Fig. 7. The shaft 13, revolving in bearings in the frame 17 and in bearings 15 fixed to the channels 16, drives the shaft 23 revolving in bearings in frame 1 by means of the sprocket wheels 18 and 19 and the chain 20. The bevel gear 21 fixed to the shaft 23 meshes with the bevel gear 22 fixed to the power shaft 24.

It will now be evident that the air entering at the flaring opening 9 will be deflected toward the periphery of the casing 7, it will then be deflected by the constraining guides 10 until it strikes the vanes 12 causing the rotation of the wheel 14 and the shaft 13 which in turn drives the power shaft 24, at the same time permitting the rotation of the supporting frame 1 about the axis of the shaft 24 so that the opening 9 will always face the wind. The rotation of the shaft 13 may be stopped by turning the wheel 52, thereby clamping the brake 51 against the friction wheel 50. In order to have the wheel rotate at a constant speed at any wind velocity at or above a desired minimum, I have provided the following means: Referring to Figs. 8, 9, 10, 11 and 12, the spur gear 28 fixed to the shaft 13 drives the spur gear 29 which is in turn fixed to the shaft 26. The bevel gear 30 fixed to the shaft 26 meshes with the bevel gear 31 which is fixed to the vertical shaft 27. The upper sleeve 33 of the governor 25 is fixed to the shaft 27, while the lower sleeve $33^a$ is adapted to slide over the shaft 27. The bar 32 has one end fitting over the sleeve $33^a$ while its other end is pivotally connected to the link 34 which is in turn connected to the link 35 by means of the turnbuckle 36. The link 35 is pivotally connected to the bar 37 which is pivoted on the pin 38. The pawls 46 and $46^a$ are pivotally connected to the bar 37 and are kept in engagement with the ratchet wheel 39 by means of the springs $46^b$. The ratchet wheel 39 being fixed to the spur gear 40 is toothed both right and left so that it may be driven by either the pawl 46 or the pawl $46^a$. The plate 49 is fixed against rotation by being fastened to the pin 38. The top of the plate 49 is rounded and shaped so that when the bar 37 is turned clockwise the pawl $46^a$ is disengaged from the ratchet and gear 40 is turned clockwise; if, however, the bar 37 is turned counterclockwise, the pawl 46 is disengaged from the ratchet 39 and the gear 40 is turned counterclockwise. The quadrant gears $41^a$, $41^b$, $41^c$ and $41^d$ are fixed to the shafts $42^a$, $42^b$, $42^c$ and $42^d$ respectively and mesh with the gear 40, as is clearly shown in Fig. 9. The shutter wings $43^a$, $43^b$, $43^c$ and $43^d$ being fixed to the shafts $42^a$, $42^b$, $42^c$ and $42^d$ respectively are shaped so as to close the space between the outer casing 7 and the cone shaped shell 11 when they are fully opened, as is apparent from Fig. 10.

It will now be evident that if the wind velocity is such as to cause the machine to run faster than the normal speed, the action of the governor 25 will lift the bar 32 as previously explained, this in turn will swing the bar 37 clockwise and by actuating the quadrant gears $41^a$, $41^b$, $41^c$ and $41^d$, the quadrant gears $41^a$, $41^b$, $41^c$ and $41^d$, respectively, will be turned so as to reduce the supply of air to the guides 10 and the vanes 12. As soon as the speed is reduced to normal, the balls of the governor drop, the bar 37 is turned counterclockwise and the pawl 46 may engage with the next tooth. This process is continued until the air supply is reduced to the required amount. If the wind velocity is below the required amount, the action of the governor will cause the bar 37 to swing counterclockwise, this in turn will cause the engagement of the pawl $46^a$ with the ratchet 39 and consequently the shutters $43^a$, $43^b$, etc., will be turned so as to increase the supply of air to the guides 10 and the vanes 12.

In order to limit the extreme positions of the gear 40, the blocks 44 and 45 are fixed to the gear 40 while the stopping block 47 is fixed to the channels 16 and placed so as to stop the rotation of the gear 40 when either of the blocks 44 or 45 come in contact with it.

The curves of the guides 10 and of the vanes 12 are obtained as follows: Referring to Fig. 7 showing a section through three consecutive guides $aa'$, $bb'$ and $cc'$, with corresponding vanes AA', BB' and CC', V represents the direction of the air entering upon the guide $aa'$, AE the absolute and AF the relative velocity of the air upon entering vane AA', and C'H the absolute and C'K the relative velocity of the air upon leaving said vane when in position CC'. AD and C'G represent the velocity of rotation. The angles formed by AF and C'K with the direction of rotation are assumed to be a practical minimum. It can be proven that the power is a maximum when the velocity of rotation AD is approximately one half of the absolute velocity AE of the air entering the vane. The result will be that the force polygon DF will be a rhombus. But the absolute velocity C'H upon leaving said vane should be as small as possible, also demanding that force polygon GK should be a rhombus as C'K=AF. The power of the moving air is proportional to the difference of the projections of the absolute velocities AE and C'H upon the direction of rotation. It is now evident from the figure that the projection of AE is a practical maximum and the projection of C'H is a practical minimum. It will thus be seen that practically the full value of the kinetic energy in the moving air entering upon the vane is utilized, said features thus comprising the perfection of the wind motor. The vane curve is constructed by equal decrements of the absolute velocity of the moving air as it passes through the wheel, causing equal angular change in rotation of the wheel. The mechanism herein disclosed embodies my preferred form. Many modifications of the same may be made, employing the same general principles. I therefore wish to claim all equivalent structures employing the same general principles.

Having thus described my invention, I claim as new and wish to secure by Letters Patent:

1. A wind motor comprising a shaft suitably mounted for rotation, a vane wheel fixed to said shaft and adapted to rotate it, a casing inclosing the vane wheel having openings at its sides permitting the air to pass therethrough, strike the vanes of the wheel and thereby drive the latter, and means, controlled by the rotation of the vane wheel, for automatically causing the wheel to rotate at a constant speed at or above a given minimum wind velocity.

2. A wind motor comprising a shaft suitably mounted for rotation, a vane wheel fixed to the said shaft and adapted to rotate it, a plurality of stationary guides fixed in front of the said rotating wheel, a casing inclosing both the said guides and rotating vane wheel having openings at its sides permitting the air to enter in front of and be guided by the said guides to the vanes of the wheel and thereby drive the latter, means for causing the wheel to rotate at constant speed at or above a given minimum wind velocity, comprising shutters adapted by their opening and closing to control the amount of air reaching the vane wheel, and means controlled by the speed of rotation of the wheel for controlling the opening and closing of the shutters.

3. A wind motor comprising a shaft suitably mounted for rotation, a vane wheel fixed to said shaft and adapted to rotate it, a cone shaped shell having its vertex facing the wind and its base facing the side of the wheel, a plurality of stationary guides fixed to said cone shaped shell and placed in front of the rotating wheel, and a casing inclosing the above mentioned elements having openings at its side permitting the air to strike the surface of the cone shaped shell, be deflected toward the periphery of the casing and follow the path outlined by the guides until it strikes the vanes of the wheel and thereby drive the latter, means for causing the wheel to rotate at constant speed at or above a given minimum wind velocity, comprising shutters adapted by their opening and closing to control the amount of air reaching the vane wheel, and means controlled by the rotation of the wheel for controlling the opening and closing of the shutters.

4. A wind motor comprising a shaft suitably mounted for rotation, a vane wheel fixed to the said shaft and adapted to rotate it, a plurality of stationary guides fixed in front of the said rotating wheel, a casing inclosing both the said guides and rotating vane wheel, having openings at its sides permitting the air to enter in front of and be guided by the said guides to the vanes of the wheel and thereby drive the latter, and means controlled by the rotation of the vane wheel for automatically causing the wheel to rotate at a constant speed at or above a given minimum wind velocity.

5. A wind motor comprising a shaft suitably mounted for rotation, a vane wheel fixed to the said shaft and adapted to rotate it, a plurality of stationary guides fixed in front of the said rotating wheel, a casing inclosing both the said guides and rotating vane wheel, having openings at its sides permitting the air to enter in front of and be guided by the said guides to the vanes of the wheel and thereby drive the latter, and means for causing the wheel to rotate at constant speed at or above a given minimum wind velocity, comprising means controlled by the rotation of the vane wheel for automatically regulating the amount of air reaching the vane wheel.

6. A wind motor comprising a shaft suitably mounted for rotation, a vane wheel fixed to the said shaft and adapted to rotate it, a plurality of stationary guides fixed in front of the said rotating wheel, a casing inclosing both the said guides and rotating vane wheel having openings at its sides permitting the air to enter in front of and be guided by the said guides to the vanes of the wheel and thereby drive the latter, means for causing the wheel to rotate at constant speed at or above a given minimum wind velocity, comprising shutters located in front of the said vane wheel adapted by their opening and closing to control the amount of air reaching the latter, and means controlled by the speed of rotation of the wheel for controlling the opening and closing of the shutters.

7. A wind motor comprising a shaft suitably mounted for rotation, a vane wheel fixed to the said shaft and adapted to rotate it, a plurality of stationary guides fixed in front of the said rotating wheel, a casing inclosing both the said guides and rotating vane wheel, having openings at its sides permitting the air to enter in front of and be guided by the said guides to the vanes of the wheel and thereby drive the latter, means for causing the wheel to rotate at a constant speed at or above a given minimum wind velocity, comprising shutters located in front of the said vane wheel adapted by their opening and closing to control the amount of air reaching the latter, and a governor operatively connected with the vane wheel and the shutters, whereby a variation in the speed of the vane wheel is accompanied by a variation in the amount of air permitted to reach the latter.

8. A wind motor comprising a shaft suitably mounted for rotation, a vane wheel fixed to the said shaft and adapted to rotate it, a plurality of stationary guides fixed in front of the said rotating wheel, a casing inclosing both the said guides and rotating vane wheel, having openings at its sides permitting the air to enter in front of and be guided by the said guides to the vanes of the wheel and thereby drive the latter, means for causing the wheel to rotate at a constant speed at or above a given minimum wind velocity, comprising shutters located in front of the said vane-wheel adapted by their opening and closing to control the amount of air reaching the latter, a ratchet wheel, having a portion of its teeth facing in one direction and a portion in the opposite direction, operatively connected with the said shutters, whereby rotation of the ratchet wheel in one direction causes opening of the shutters while rotation in the opposite direction causes closing of the shutters, a rocker pivoted adjacent to the ratchet wheel, two pawls pivotally connected to the said rocker and placed opposite to each other and adapted to engage with the oppositely directed teeth, means adapted to disengage one pawl from the ratchet with the other remaining engaged when the rocker is turned clockwise and to reverse their action when the rocker is turned counterclockwise, and means operatively connected with the vane wheel and controlled by the speed of the latter to cause the swinging of the rocker in either direction.

9. A wind motor comprising a shaft suitably mounted for rotation, a vane wheel fixed to the said shaft and adapted to rotate it, a plurality of stationary guides fixed in front of the said rotating wheel, a casing inclosing both the said guides and rotating vane wheel, having openings at its sides permitting the air to enter in front of and be guided by the said guides to the vanes of the wheel and thereby drive the latter, means for causing the wheel to rotate at a constant speed at or above a given minimum wind velocity, comprising shutters located in front of the said vane wheel adapted by their opening and closing to control the amount of air reaching the latter, a ratchet wheel, having a portion of its teeth facing in one direction and a portion in the opposite direction, operatively connected with the said shutters, whereby rotation of the ratchet wheel in one direction causes opening of the shutters while rotation of the ratchet wheel in the opposite direction causes closing of the shutters, a rocker pivoted adjacent to the ratchet wheel, two pawls pivotally connected to the said rocker and placed opposite to each other and adapted to engage with the oppositely directed teeth, means adapted to disengage one pawl from the ratchet with the other remaining engaged when the rocker is turned clockwise and to reverse their action when the rocker is turned counter-clockwise, and a governor operatively connected with the vane wheel and the said rocker, adapted to cause the rocker to rotate in one direction when the balls of the governor are moving toward their axis of rotation and to cause the rocker to rotate in the opposite direction when the balls are moving away from their axis of rotation.

10. A wind motor comprising a shaft suitably mounted for rotation, a vane wheel fixed to the said shaft and adapted to rotate it, a cone shaped shell having its vertex facing the wind and its base facing the side of the said wheel, a plurality of stationary guides fixed in front of the said rotating wheel, a casing inclosing the above mentioned elements, having openings at its side permitting the air to strike the surface of the cone shaped shell, be deflected toward the periphery of the casing and follow the path outlined by the guides until it strikes the vanes of the wheel and thereby drive the latter, and means controlled by the rotation of the vane wheel for automatically causing the wheel to rotate at a constant speed at or above a given minimum wind velocity.

11. A wind motor comprising a shaft suitably mounted for rotation, a vane wheel fixed to the said shaft and adapted to rotate it, a cone shaped shell having its vertex facing the wind and its base facing the side of the wheel, a casing inclosing the above mentioned elements, having openings at its side permitting the air to strike the surface of the cone shaped shell, be deflected toward the periphery of the casing until it strikes the vanes of the wheel and thereby drive the latter, and means controlled by the rotation of the vane wheel for automatically causing the wheel to rotate at a constant speed at or above a given minimum wind velocity.

12. A wind motor comprising a shaft suitably mounted for rotation, a vane wheel fixed to the said shaft and adapted to rotate it, a cone shaped shell having its vertex facing the wind and its base facing the side of the wheel, a plurality of stationary guides fixed to the said cone shaped shell and placed in front of the said rotating wheel and a casing inclosing the above mentioned elements, having openings at its side permitting the air to strike the surface of the cone shaped shell, be deflected toward the periphery of the casing and follow the path outlined by the guides until it strikes the vanes of the wheel and thereby drive the latter, means for causing the wheel to rotate at a constant speed at or above a given minimum wind velocity, comprising shutters located in front of the said vane wheel adapted by their opening and closing to control the amount of air reaching the latter, and a governor operatively connected with the vane wheel and the shutters, whereby a variation in the speed of the vane wheel is accompanied by a variation in the amount of air permitted to reach the latter.

13. A wind motor comprising a shaft suitably mounted for rotation, a wheel having curved vanes being fixed to the said shaft and adapted to rotate it, a cone shaped shell having its vertex facing the wind and its base facing the side of the said wheel, a plurality of stationary curved guides fixed to the said cone shaped shell and placed in front of the said rotating wheel and a casing inclosing the above mentioned elements, having openings at its side permitting the air to strike the surface of the cone shaped shell, be deflected toward the periphery of the casing and follow the path outlined by the guides until it strikes the vanes of the wheel and thereby drive the latter, means for causing the wheel to rotate at a constant speed at or above a given minimum wind velocity, comprising shutters located in front of the said vane wheel adapted by their opening and closing to control the amount of air reaching the latter, a ratchet wheel, having a portion of its teeth facing in one direction and a portion in the opposite direction, operatively connected with the said shutters, whereby rotation of the ratchet wheel in one direction causes opening of the shutters while rotation in the opposite direction causes closing of the shutters, a rocker pivoted adjacent to the ratchet wheel, two pawls pivotally connected to the said rocker and placed opposite to each other and adapted to engage with the oppositely directed teeth, means adapted to disengage one pawl from the ratchet with the other remaining engaged when the rocker is turned clockwise, and to reverse their action when the rocker is turned counterclockwise, and a governor operatively connected with the vane wheel and the said rocker, adapted to cause the rocker to rotate in one direction when the balls of the governor are moving toward their axis of rotation and to cause the rocker to rotate in the opposite direction when the balls are moving away from their axis of rotation.

14. A wind motor comprising a shaft suitably mounted for rotation, a vane wheel fixed to the said shaft and adapted to rotate it, a plurality of stationary guides fixed in front of the said rotating wheel, a casing inclosing both the said guides and rotating vane wheel, having openings at its sides permitting the air to enter in front of and be guided by the said guides to the vanes of the wheel and thereby drive the latter, means for causing the wheel to rotate at a constant speed at or above a given minimum wind velocity, comprising shutters located in front of the said vane wheel adapted by their opening and closing to control the amount of air reaching the latter, a ratchet wheel, having a portion of its teeth facing in one direction and a portion in the opposite direction, operatively connected with the said shutters, whereby rotation of the ratchet wheel in one direction causes opening of the shutters while rotation in the opposite direction causes closing of the shutters, a rocker pivoted adjacent to the ratchet wheel, two pawls pivotally connected to the said rocker and placed opposite to each other and adapted to engage with the oppositely directed teeth, means adapted to disengage one pawl from the ratchet with the other remaining engaged when the rocker is turned clockwise and to reverse their action when the rocker is turned counterclockwise, means operatively connected with the vane wheel and controlled by the speed of the latter to cause the swinging of the rocker in either direction and a mounting for the said motor permitting rotation about a vertical axis, whereby the side of the vane wheel will always be facing the direction of the wind.

Signed at New York city, in the county of New York and State of New York, this 15 day of October, A. D. 1915.

JOHN ALBERT DALEN.

Copies of this patent may be obtained for five cents each, by addressing the "Commissioner of Patents, Washington, D. C."